United States Patent [19]
Piquerez

[11] 3,750,388
[45] Aug. 7, 1973

[54] HERMETIC WATCH CASE

[76] Inventor: Ervin Piquerez, deceased, late of Bassecourt, Switzerland; by Ami Scholler, Bienne; by Edouard Bandelier, Binningen, both of Switzerland, executors

[22] Filed: Sept. 15, 1969
[21] Appl. No.: 858,083

[30] Foreign Application Priority Data
Sept. 16, 1968 Switzerland.................... 13997/68

[52] U.S. Cl...................... 58/90 R, 58/91, 277/227
[51] Int. Cl. ........................................... G04b 37/08
[58] Field of Search........................... 58/90 A, 91; 277/227, 58

[56] References Cited
FOREIGN PATENTS OR APPLICATIONS
251,698  11/1947  Switzerland............................. 58/91
313,607  4/1956  Switzerland............................ 58/91

Primary Examiner—Stephen J. Tomsky
Assistant Examiner—George H. Miller, Jr.
Attorney—Robert E. Burns and Emmanuel J. Lobato

[57] ABSTRACT

A watch case with a seal between the case and a mounting fitted on the watch glass where the glass can either be swaged or bonded to the mounting or the glass can be provided with a seal between the rim of the glass and the mounting in the same way that the mounting is fitted to the case, in this latter case the rim of the glass and the mounting could be provided with grooves for the seal.

7 Claims, 2 Drawing Figures

HERMETIC WATCH CASE

This invention relates to a watch case such as is described in Swiss Pat. No. 394, 960. This aforesaid patent specifies the machining of a groove in the edge of the glass, which can raise difficulties according to the shape of this glass and to the material employed.

In particular, this may result in machining troubles, weakening of the glass, or else an unprepossessing appearance due to sight of the insert through the glass.

The present invention consists in a watch case wherein the glass is provided with an annular mounting arranged to fit on a bearing surface of the case with intercalation of a sealing insert, the said insert being of sufficient strength to interlock the mounting and the case, and wherein the mounting on its periphery is provided with a groove for the insert.

Figure 1:
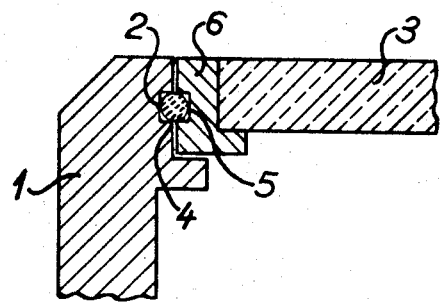
FIG. 1 is a partial cross-section of the first form of embodiment according to the invention.

In carrying the invention into effect by one convenient mode by way of example, the first form of embodiment, illustrated in FIG. 1, has a lens-mount 1 in which has been wrought a groove 2 to allow of securing the glass 3 by means of a sealing insert 4 engaged into a corresponding groove 5 which is itself wrought in an annular metal mounting or rim 6; the glass is secured to the mounting or rim by appropriate means, specifically by upsetting or by bonding.

Figure 2:
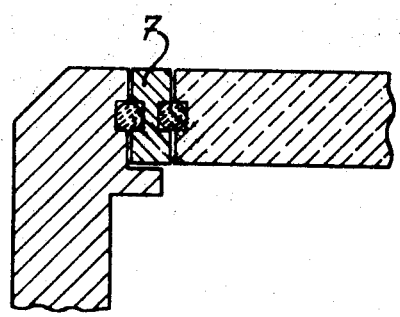
FIG. 2 is a partial cross-section of the second form of embodiment.

In the second form of embodiment, illustrated in FIG. 2, the rim 7 is secured to the glass by the same means as to the mount, that is to say by means of a sealing insert or packing co-operating with two grooves, one in the glass and the other in the rim 7.

It is thus possible to secure the glass-rim assembly as well as the glass in the rim in effective manner, with an unexceptionable appearance and with particularly satisfactory strength.

I claim:

1. In a watch case, the combination of a lens glass, an annular rim surrounding said lens glass and sealed and secured to the peripheral edge thereof, said rim having a cylindrical outer peripheral edge surface with an annular groove in said edge surface intermediate front and rear faces of said rim, and a lens mount having an opening of a size and shape to receive said rim, said opening having a cylindrical inner peripheral wall surface engaging the outer peripheral edge of said rim and an annular groove in said inner peripheral wall surface registering with said annular groove in the outer peripheral edge surface of said rim, and an annular sealing insert received in said registering grooves and of sufficient strength to interlock said rim and lens mount.

2. A combination according to claim 1, wherein said lens mount is provided with a shoulder inwardly of said opening in position for said rim to seat on and be positioned by said shoulder when said groove in the outer peripheral edge of the rim registers with said groove in the inner peripheral wall of said opening.

3. A combination according to claim 1, wherein said rim is secured to the lens glass by the swaging of said rim over the edge of said lens glass.

4. A combination according to claim 1, wherein said rim is bonded to the peripheral edge of said lens glass.

5. A combination according to claim 1, wherein a groove in the peripheral edge of said lens glass registers with a groove in the inner peripheral edge of said rim and in which said rim is secured to said lens glass by a sealing insert in said registering grooves in the rim and lens glass.

6. A combination according to claim 1, wherein said rim has an annular inwardly projecting shoulder on which said lens glass seats and by which it is positioned relative to said rim.

7. In a watch case, the combination of a lens glass, an annular metal rim surrounding said lens glass and sealed and secured to the peripheral edge thereof, said metal rim having an annular groove in its outer peripheral edge, and a lens mount having an opening of a size and shape to receive said rim, said opening having an inner peripheral wall engaging the outer peripheral edge of said rim and an annular groove in said inner peripheral wall registering with said annular groove in the outer peripheral edge of said rim, and an annular sealing insert received in said registering grooves and of sufficient strength to interlock said rim and lens mount.

* * * * *